Aug. 11, 1964  O. C. KOPPEN  3,143,995
POWERBOAT STEERING CONTROL
Filed May 4, 1962  2 Sheets-Sheet 2

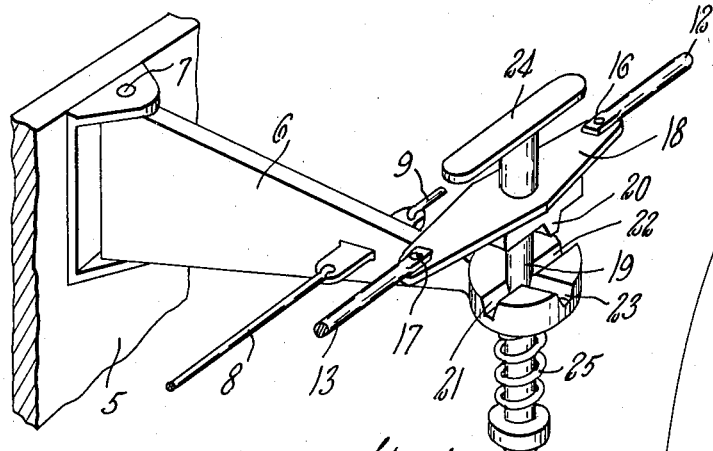
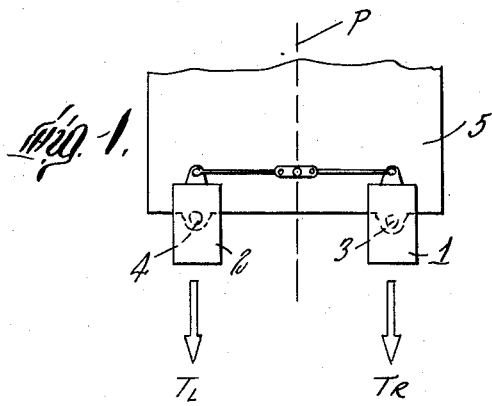
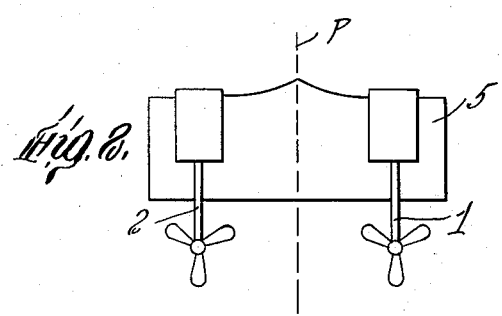
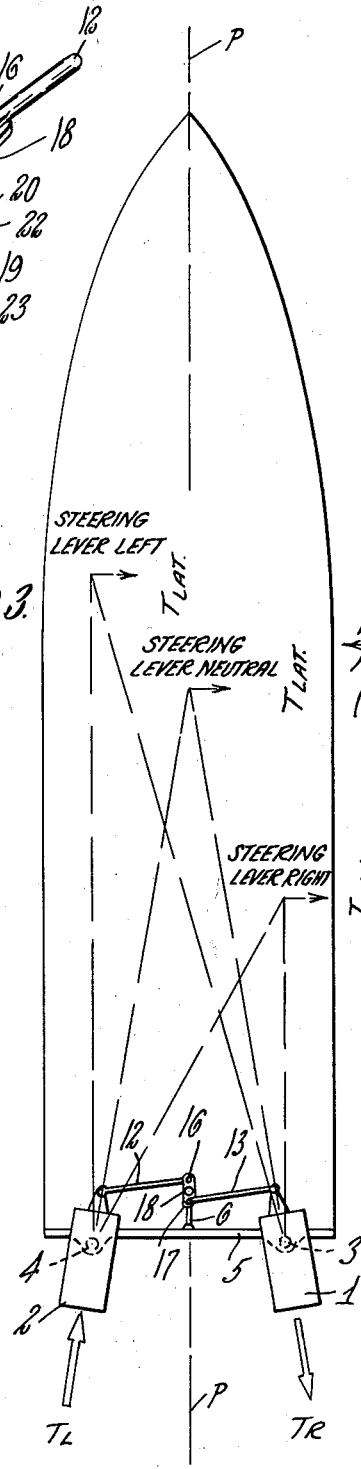

United States Patent Office 3,143,995
Patented Aug. 11, 1964

3,143,995
POWERBOAT STEERING CONTROL
Otto C. Koppen, 29 Woodcliff Road, Wellesley, Mass.
Filed May 4, 1962, Ser. No. 192,550
9 Claims. (Cl. 115—37)

This invention concerns means for controlling twin-screw outboard powerboats while maneuvering at slow speed, especially under adverse conditions of wind and current, and, more particularly, concerns means for providing in such a powerboat a transversely acting thrust component upon simultaneous establishment of a forward thrust component of one screw and a rearward thrust component of the other so that the powerboat may in effect be moved sideways even in the absence of any forward or astern movement. The term "outboard" is intended to describe any powerplant in which the thrust vector may be turned about a vertical axis for steering control, such powerplant also being provided with conventional steering, forward, reverse and throttle controls.

With the steering systems now in use it is impossible to produce a lateral thrust force while the boat is stationary. A typical problem caused by this condition occurs while attempting to dock in a restricted space along a pier with an offshore wind blowing at right angles to the pier. With conventional controls the boat can be maneuvered opposite the opening but cannot be moved laterally against the wind without the aid of lines and shoreside assistance which is often not available.

As a major object, this invention provides a simple means for producing a lateral motion of a powerboat and at the same time provides a means for controlling the angular orientation of the boat to compensate for boat trim, wind effects and the like.

More specifically, this is accomplished by providing means for selectively controlling the steerable screws or other thrust means for effective intersection considered in a horizontal plane of the lines of thrust of said screws upon simultaneous establishment of a forward thrust component of one of said screws and a rearward thrust component of the other of said screws. Preferably, the point of intersection of the lines of thrust is well within the length of the boat, and the steering means includes means for angular movement of the lines of thrust at differing rates selectively to move said intersection forward or aft along the powerboat, and as a result of a uniform steering direction response, in order to turn the boat or to compensate for trim, wind or the like, all while the boat may be substantially stationary.

Various other objects and features of the invention will become apparent from the following detailed description of a preferred embodiment thereof, taken with the accompanying drawings, wherein:

FIG. 1 is a plan view of the stern portion of a powerboat having a pair of steerable outboard engines arranged in the conventional straight ahead position with their thrust axes parallel to the centerline of the boat;

FIG. 2 is a stern view of the powerboat of FIG. 1;

FIG. 3 is a plan view of a powerboat having a pair of steerable outboard engines turned for intersection of their thrust axes according to the present invention;

FIG. 4 is a detail view of the control means of FIG. 3; and

Figure 5:
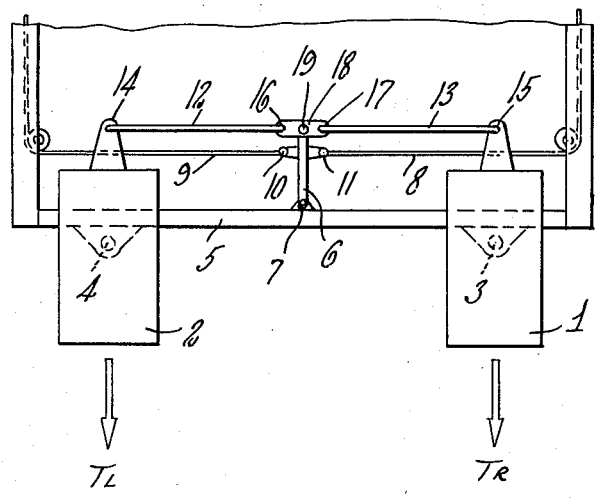
FIGS. 5 through 7 are enlarged plan views of the stern portion of the powerboat of FIGS. 1–3 showing the control of the invention arranged for conventional steering, and for producing a lateral thrust component to the left or right, according to the invention.

Referring to the drawings, the outboard engines 1 and 2 including their screws are attached to the boat transom 5 laterally displaced from the boat centerplane P. For steering purposes the screws may be rotated about vertical axes 3 and 4 in the conventional manner. The lever 6 is pivotally mounted on transom 5 for rotation about a vertical axis 7. It is rotated about axis 7 by a conventional steering wheel, not shown, by means of the control cables 8 and 9 attached to lever 6 so that when the steering wheel is turned to the right, lever 6 rotates to the left and vice versa. The engines 1 and 2 are connected to lever 6 by means of link rods 12 and 13 which are pivotally mounted on said engines for pivotal movement about axes 14 and 15. Said rods are eccentrically pivoted at 16 and 17 to the crank 18, which is mounted on lever 6 for adjustable positioning as hereinafter explained. When crank 18 is in the position shown in FIGS. 4 and 5, the steering operation is conventional.

Figure 6:
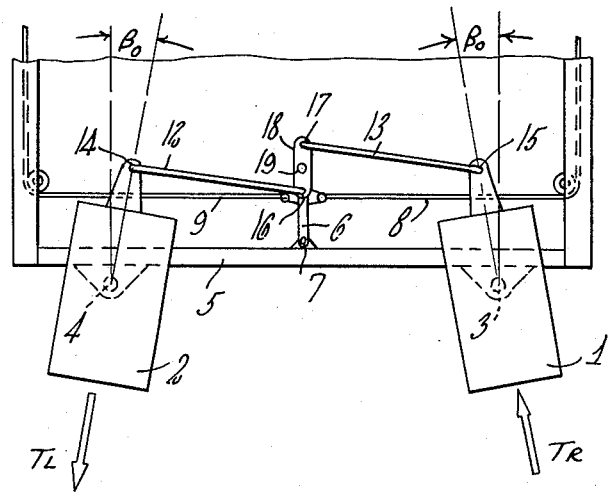
Figure 7:
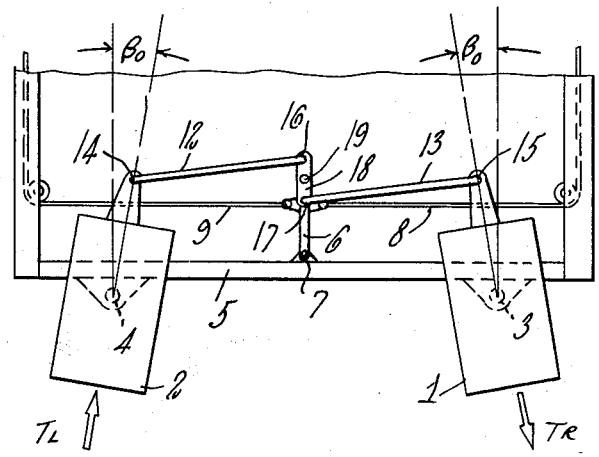

FIGS. 3 and 7 show the adjusted position of crank 18 and the direction of the engine thrust vectors $T_L$ and $T_R$ to provide a lateral thrust component to the right, while FIG. 6 shows the adjusted location of crank 18 and the direction of the engine thrust vectors $T_L$ and $T_R$ to provide a lateral thrust component to the left. The eccentricity of the pivots 16 and 17 on crank 18 is chosen so that the thrust lines effectively intersect at centerplane P approximately at ½ of the boat length forward of the stern. This eccentricity provides the toe-in angle $B_0$. The amount of the lateral thrust then is $$T_{LAT.} = (T_R + T_L) \sin B_0$$

where $T_R$ is the positive forward thrust of the right hand engine 1 and where $T_L$ is the negative rearward thrust of the left hand engine 2.

(These components are additive because the angles $B_0$ of the two engines are opposite in sign.)

The throttles are adjusted so that $$T_R \cos B_0 + T_L \cos B_0 = 0$$

i.e., so that boat has no forward or rearward motion. The amount of engine power used depends on the strength of the wind or current. FIGS. 3 and 7 show the location of the crank 18 and the engine thrust directions for the production of lateral force to the right. The operation is the same as described above in connection with FIG. 2.

It will be noted that crank 18 is indexed with pivot 17 forward in FIG. 6 and with pivot 16 forward in FIGS. 3 and 7. The reason for this will be explained hereinafter in connection with FIG. 3.

FIG. 4 shows in detail the mounting of crank 18 on the steering lever 6. Crank 18 is attached to lever 6 by means of spindle 19 and is held in contact with lever 6 by means of the spring 25. Crank 18 has a spline 20 projecting from its lower surface and lever 6 has 3 grooves 21, 22 and 23 spaced 90° apart in its upper surface. By means of handle 24, crank 18 can be lifted by compressing spring 25 and indexed in one of three positions; with spline 20 in grooves 21, 22 or 23. With the spline 20 and the grooves 21, 22, and 23 in the orientation shown in FIG. 4, crank 18 would be in the position shown in FIGS. 1 and 5 when the spline 20 is engaged in groove 23, in the position shown in FIG. 6 when the spline 20 is engaged in groove 22, and in the position shown in FIGS. 3 and 7 when the spline 20 is engaged in the groove 21. It will be understood that once the position of crank 18 has been selected, crank 18 will act as an integral part of lever 6 when lever 6 is rotated to turn the engines about their vertical axes 3 and 4.

FIG. 3 is a diagram more fully showing the control of the angular orientation of the boat at zero forward or reverse speed while at the same time producing a lateral thrust component. Such a control is a most desirable one, since the wind center of pressure is a variable depending on the angle of the wind to the boat. Moreover, if the boat has a lateral velocity the water drag will act at a different point longitudinally than the wind center of pressure. Consequently during a docking maneuver, a variation of the point of application of the resultant of the external forces should be expected.

The longitudinal variation of the point of application of the external forces will produce a turning moment about any arbitrarily chosen vertical axis, and if the attitude is to remain constant the operator must be able to counteract the moments produced by the external forces by means of his steering control.

A simple and convenient approach to the moment produced by the engines is to consider the forces at the point at which the thrust lines intersect. Since the thrust vectors pass through this point, they have no moment about it and since the throttles are adjusted so that the longitudinal components of the thrust are equal and opposite, i.e., so that the boat has no forward or reverse speed, the lateral offset of the point of intersection of the thrust lines produces no moment. Consequently the only thrust force capable of producing a moment is the lateral component of the thrust acting at the point of intersection of the thrust lines.

The problem of controlling the angular attitude of the boat is solved by giving the operator the ability to move the lateral force component of the thrust longitudinally until it coincides with the position of the resultant external force. This is done in a natural way by use of the steering wheel. Consider the situation shown in FIG. 3 where the engines are set to produce a thrust component to the right to balance a wind force $F_W$ acting to the left. With the steering wheel neutral, the wind force $F_W$ is shown located ahead of the intersection of the thrust vectors and a couple would be produced to rotate the boat to the left. However by turning the steering wheel to the right, which moves the steering lever 6 to the left, the intersection of the thrust vectors will be moved forward as shown in FIG. 3 and the rotation will be stopped and reversed if necessary.

The fore-and-aft motion of the intersection of the thrust vectors is due entirely to the differential angular motion of the engines caused by the eccentricity of the pivots 16 and 17 on crank 18. When crank 18 is in the position to toe-in the engines, the difference in effective steering lever arm is equal to twice the eccentricity of the pivot location. Consequently for a given angular change of the steering lever 6, the engine having its pivot point 16 or 17 forward will move through a greater angle. This difference of the rate of angular movement of the two engines about their steering axes 3 and 4 causes the intersection of the thrust lines to move in the fore-and-aft direction as the steering lever is turned.

It has been noted that different positions of the crank 18 are used in order to produce a lateral component of thrust to the left and right. It is obvious that the direction of the thrusts used alone determines the direction of the lateral thrust component and is independent of whether pivot 16 or 17 is in the forward position. However to have the steering work in the correct sense, i.e., to have right wheel produce right turn, the pivot point of the engine having forward thrust must be in the forward position.

Various modifications within the spirit of the invention and the scope of the appended claims will be apparent to those skilled in the art.

I claim:

1. In a powerboat having a pair of transversely spaced thrust means independently controllable simultaneously to provide steerable forward and reverse thrust forces each acting along an independent line of thrust, linkage means interconnecting said thrust means for selectively controlling each of said thrust means simultaneously for effective intersection of said lines of thrust within the length of said boat to provide a transversely acting thrust force component upon simultaneous establishment of a forward thrust component of one of said thrust means and a rearward thrust component of the other of said thrust means.

2. In a powerboat having a pair of transversely spaced steerable screws each independently reversible simultaneously to provide steerable forward and reverse thrust forces each acting along an independent line of thrust generally axially of the axis of rotation of a said screw, linkage means interconnecting said thrust means for selectively positioning each of the axes of said screws simultaneously for effective intersection of said screw axes within the length of said boat to provide a transversely acting thrust force component upon establishment of a forward thrust component of one of said screws and a reverse thrust component of the other of said screws.

3. In a powerboat having a pair of transversely spaced thrust means independently controllable simultaneously to provide steerable forward and reverse thrust forces each acting along an independent line of thrust, linkage means interconnecting said thrust means for selectively controlling each of said thrust means simultaneously for effective intersection of said lines of thrust within the length of said powerboat to provide a transversely acting thrust force component upon simultaneous establishment of a forward thrust component of one of said thrust means and a substantially equal rearward thrust component of the other of said thrust means, and means for simultaneously steering said thrust means for angular movement of said intersecting lines of thrust in the same direction at differing angular rates selectively to move said intersection forward and aft along said powerboat.

4. In a powerboat as claimed in claim 3, wherein further means are provided for selectively establishing a greater angular rate for either of said thrust means.

5. In a powerboat having a pair of transversely spaced steerable screws each independently reversible simultaneously to provide steerable forward and reserve thrust forces each acting along an independent line of thrust generally axially of the axes of rotation of a said screw, linkage means interconnecting said thrust means for selectively positioning each of the axis of said screws simultaneously for intersection of said screw axes within the length of said powerboat selectively to provide a transversely acting thrust force component in either one of two transverse directions upon establishment of a forward thrust component of a selected one of said screws and a substantially equal reverse thrust component of the other of said screws, means for simultaneously steering said screws by rotating said screws about a vertical axis for angular movement of the intersecting axes of said screws in the same direction, and means for selectively establishing a greater rate of angular movement of one of said axes selectively to move said intersection forward and aft along said powerboat while maintaining a uniform directional response of said means for simultaneously steering said screws during either direction of establishment of said transversely acting thrust component.

6. In a powerboat, means to cause lateral movement of said powerboat comprising a pair of thrust means pivotally mounted on said boat laterally displaced from the centerline thereof, said thrust means being rotatable about their vertical axes for steering said boat, power control means connected to said thrust means including forward and reverse controls, steering means for simultaneously rotating said thrust means about their vertical axes, and steering linkage means interposed between and interconnecting said steering means with said thrust means for selectively positioning said thrust means simultaneously so that the resultant components of each of their thrust vectors intersect within the length of said boat, the total resultant force of said thrust means thus causing only lateral movement of said boat when one of said thrust means has a forward thrust vector component and when the other of said thrust means has a reverse thrust vector component equal to said forward component.

7. In a powerboat as claimed in claim 6 wherein said steering linkage means is also adapted to selectively provide simultaneous differential angular movement of said thrust means about their vertical axes on movement of said steering means from said neutral steering position thus selectively to shift forward or aft the point of intersection of said resultant vector components of each of said thrust means and thus to provide means to counteract any pivotal movement of said boat.

8. In a powerboat as claimed in claim 7 wherein said steering linkage means comprises a lever pivotally mounted on said boat between said thrust means, said lever having a vertical axis at its end adjacent said boat, and said lever being connected to said steering means and being adapted to be rotated about its vertical axis thereby, crank means rotatably mounted on said lever at the other end thereof, said crank means having horizontally extended portions thereof and rod means pivotally mounted thereon connecting said extended portions to said adjacent thrust means, handle means to rotate said crank means to less extended positions, and means to retain said crank means in selectively predetermined positions in relation to said lever.

9. In a powerboat having a pair of outboard screws pivotally mounted at the stern thereof and laterally displaced from the centerline thereof, said outboard screws being rotatable about their vertical axes for steering said boat, and steering means for simultaneously rotating said outboard screws about their vertical axes, steering linkage means, adapted to position said outboard screws simultaneously so that the resultant components of each of their thrust vectors intersect within the length of said boat and adapted to provide simultaneous differential angular movement of said outboard screws about their vertical axes, which comprises, a lever pivotally mounted on said boat between said outboard screws, said lever having a vertical axis at its end adjacent said boat, and said lever being connected to said steering means and being adapted to be rotated about its vertical axis thereby, crank means rotatably mounted on said lever at the other end thereof, said crank means having horizontally extended portions thereof adjacent each of said outboard screws and having rod means pivotally mounted thereon connecting said extended portions to said adjacent outboard screws, handle means to rotate said crank means to less extended positions, and means to retain said crank means in selectively predetermined positions in relation to said lever.

References Cited in the file of this patent

FOREIGN PATENTS 906,907     Germany _____ Mar. 18, 1954